United States Patent
Van Wageningen et al.

(10) Patent No.: US 9,444,266 B2
(45) Date of Patent: Sep. 13, 2016

(54) WIRELESS INDUCTIVE POWER TRANSFER WITH TEMPERATURE CONTROL OF THE RECEIVER

(71) Applicant: KONINKLIJKE PHILIPS N.V., Eindhoven (NL)

(72) Inventors: Andries Van Wageningen, Wijlre (NL); Antonius Adriaan Maria Staring, Eindhoven (NL); Johannes Gerardus Fredericus Kablau, Eindhoven (NL); Wilhelmus Gerardus Maria Ettes, Leeuwarden (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/772,145

(22) PCT Filed: Jul. 11, 2014

(86) PCT No.: PCT/EP2014/064879
§ 371 (c)(1),
(2) Date: Sep. 3, 2015

(87) PCT Pub. No.: WO2015/007624
PCT Pub. Date: Jan. 22, 2015

(65) Prior Publication Data
US 2016/0118808 A1    Apr. 28, 2016

(30) Foreign Application Priority Data
Jul. 17, 2013 (EP) .................................... 13176841

(51) Int. Cl.
*D06F 75/24* (2006.01)
*H02J 5/00* (2016.01)

(52) U.S. Cl.
CPC .................... *H02J 5/005* (2013.01)

(58) Field of Classification Search
CPC .......... H02J 5/005; H02J 7/025; H01F 38/14
See application file for complete search history.

(56) References Cited

U.S. PATENT DOCUMENTS

| 5,783,806 A | 7/1998 | Hayasaki |
|---|---|---|
| 2012/0119914 A1 | 5/2012 | Uchida |

(Continued)

FOREIGN PATENT DOCUMENTS

| EP | 0621739 A2 | 10/1994 |
|---|---|---|
| JP | 2004227804 A | 8/2004 |

(Continued)

OTHER PUBLICATIONS

Website, www.wirelesspowerconsortium.com/about/benefits.html, Downloaded Sep. 9, 2015, 6 Pages.

(Continued)

*Primary Examiner* — Kenneth B Wells
*Assistant Examiner* — Rafael Pacheco

(57) ABSTRACT

A wireless power transfer system comprises a power transmitter (101) arranged to generate a wireless inductive power transfer signal for powering a power receiver (105). The system comprises a temperature controlled power loop setting an operating temperature for a heating part of a powered device. The system further comprises a receiver (207) for receiving a first temperature for a part of a powered device where the powered device is powered by the power receiver (105). A comparator (209) compares the measured temperature to a first reference temperature associated with the power transmitter (101). In response to the first temperature exceeding the reference temperature, a controller (213) proceeds to restrict the power of the power transfer signal and/or to generate a user alert. The first temperature may specifically relate to a contact surface of the powered device and the reference temperature may be a maximum allowable temperature of a contact surface for receiving the powered device during power transfer.

17 Claims, 8 Drawing Sheets

(56) References Cited

U.S. PATENT DOCUMENTS

2012/0223590 A1    9/2012  Low et al.
2014/0292101 A1*  10/2014  Baarman ................. D06F 75/08
                                                        307/104

FOREIGN PATENT DOCUMENTS

| WO | 2009004542 A2 | 1/2009 |
| WO | 2010080738 A1 | 7/2010 |
| WO | 2011010375 A1 | 1/2011 |
| WO | 2013086064 A1 | 6/2013 |

OTHER PUBLICATIONS

QI System Description, Wireless Power Transfer, vol. 1: Low Power, Part 1: Interface Definition;, June 2013, 181 Pages.

ISO/IEC 18092, Informatin Technology—Telecommunications and Information Exchange Between Systems—Near Field Communication—Interface and Protocol, Second Edition, March 15, 2013, 52 Page Document.

* cited by examiner

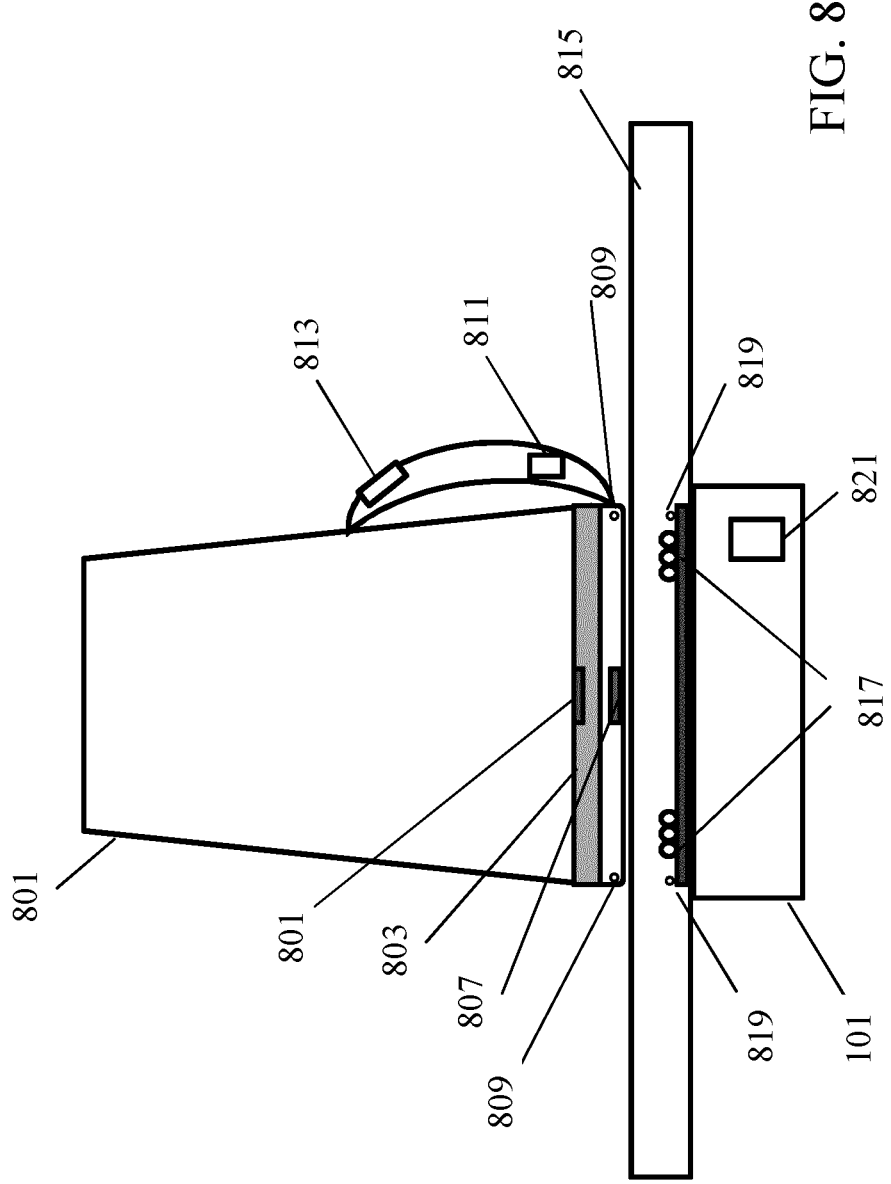

WIRELESS INDUCTIVE POWER TRANSFER WITH TEMPERATURE CONTROL OF THE RECEIVER

CROSS-REFERENCE TO PRIOR APPLICATIONS

This application is the U.S. National Phase application under 35 U.S.C. §371 of International Application No. PCT/EP2014/064879, filed on Jul. 11, 2014, which claims the benefit of European Patent Application No. EP13176841.8, filed on Jul. 17, 2013. These applications are hereby incorporated by reference herein.

FIELD OF THE INVENTION

The invention relates to inductive power transfer and in particular, but not exclusively, to an inductive power transfer system suitable for the Qi wireless power transfer standard.

BACKGROUND OF THE INVENTION

Many systems require a wiring and/or electrical contacts in order to supply electrical power to devices. Omitting these wires and contacts provides for an improved user experience. Traditionally, this has been achieved using batteries located in the devices but this approach has a number of disadvantages including extra weight, bulk and the need to frequently replace or recharge the batteries. Recently, the approach of using wireless inductive power transfer has received increasing interest.

Part of this increased interest is due to the number and variety of portable and mobile devices having exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

As mentioned, most present day devices require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each power supply being dedicated to a specific device. Although, internal batteries may prevent the need for a wired connection to an external power supply, this approach only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers which have a tight coupling between the primary transmitter coil and the secondary receiver coil. By separating the primary transmitter coil and the secondary receiver coil between two devices, wireless power transfer between the devices becomes possible based on the principle of a loosely coupled transformer.

Such an arrangement allows a wireless power transfer to the device without requiring any wires or physical electrical connections. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on their website: http://www.wirelesspowerconsortium.com/index.html, where in particular the defined Standards documents can be found.

Wireless power transfer systems are applied in an increasing variety and number of applications. For example, work is ongoing to expand the Qi power transfer standard to include high power applications with the potential of powers of up to more than 1 kW. Such high power capability leads to wireless power transfer systems being practical for more and more applications. However, this also introduces more challenges and specifically increases the risk of undesirable situations occurring. Thus, there is a desire to introduce control aspects to wireless power transfer systems which mitigate the risk of undesirable or even potentially unsafe scenarios occurring.

For example, it is envisaged that wireless power transfer may be used in a kitchen environment to power to various kitchen appliances and devices, including high power devices such as kettles, pans, blenders etc.

However, in such embodiments, additional considerations must be taken into account to ensure that undesired and unsafe scenarios do not occur. This must also consider the potential behavior of the user. For example, in the kitchen application there may be a range of power provision points including some intended for heating pans or kettles, some intended for other devices such as blenders, mixers etc. The specific layout and materials used may depend on a number of issues, including aesthetic and design preferences, and therefore different parts may use different materials etc.

However, users will generally not consider such aspects and will typically not be focused on where devices can be positioned. For example, the user may not consider that some devices should be restricted to specific areas or parts of the worktop due to their power transfer characteristics or application.

Hence, an improved power transfer system would be advantageous and in particular a system allowing an improved user experience, increased reliability, increased flexibility, facilitated implementation, improved safety and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an wireless power transfer system including a power transmitter and a power receiver, the power transmitter being arranged to generate a wireless inductive power transfer signal for powering the power receiver, the wireless power transfer system comprising: a receiver for receiving a first temperature for a first part of a powered device, the powered device comprising a heating part capable of being heated by power from the power transfer signal and the first part being a contact surface of the powered device for contacting the power transmitter; a comparator for comparing the first temperature to a first reference temperature, the first reference temperature being indicative of a maximum allowable contact temperature for a surface of the power transmitter for receiving the power receiver; and a controller for at least one of restricting the power of the power transfer signal and generating a user alert in response to the first temperature exceeding the first reference temperature; and wherein the power receiver comprises: a first temperature sensor for determining a second temperature for a heating part of the powered device, a transmitter for transmitting power control loop feedback messages for requesting power level changes of the power transfer signal to the power transmitter during power transfer, and a power controller for generating power change requests for the power control loop feedback messages in response to the second temperature.

The invention may allow an improved wireless power transfer system in many embodiments. In many embodiments, an improved user experience can be achieved. The approach may in many embodiments and scenarios provide a safer operation and safeguard, prevent, or mitigate against undesirable scenarios. The invention may in particular be advantageous for scenarios wherein a variety of different devices may be powered by one or more power transmitters and/or where the power providing entity may comprise different parts with different physical characteristics and material properties.

In many embodiments, improved operation may be achieved with one temperature control function controlling the operating temperature of the heating part, and thus specifically controlling the heating operation, whereas another temperature control function ensures thermal compatibility between the power transmitter and the power receiver/powered device. The approach may allow both accurate heating and safe operation while maintaining low complexity.

The invention may in many embodiments, prevent or mitigate the risk of damage to a surface of the object/device/appliance comprising the power transmitter. This may be achieved without generally restricting the operation of the power transfer system. Thus, the system may dynamically monitor and adapt to the specific scenario.

The first reference temperature may be indicative of a maximum allowable contact temperature for a surface for receiving the power receiver for/during power transfer. The power receiver may be placed on the surface during power transfer, and the first temperature may be indicative of the temperature of a contact surface of the power receiver which is in contact with the surface (of the power transmitter). The surface may be a surface comprising, in contact with, or close to (typically within 1, 2, 3 or 5 cm) a power transmit coil arranged to generate the power transfer signal. The maximum allowable contact temperature may be the maximum temperature acceptable for a surface of a powered device which comes into contact with the surface (of the power transmitter) during power transfer. The surface for receiving the power receiver may specifically be a work surface of a kitchen object or element comprising wireless power functionality (and specifically the power transmitter).

The reference temperature is specifically be a maximum allowable contact temperature for a surface associated with the power transmitter, such as a surface for receiving the power receiver/powered device when this is powered by the power transmitter. The surface is specifically a surface for receiving the powered device comprising the power receiver for power transfer. The reference temperature may be a property of a material of the part forming the surface for receiving the powered device. The reference temperature may be generated by the power transmitter. In some embodiments, the reference temperature may be transmitted from the power transmitter to the power receiver. In many embodiments, the first temperature may be a temperature of an external part of the powered device. The part may specifically be a part of the powered device arranged for contact with surfaces of the power transmitter entity, such as the bottom of the powered device.

The controller may be arranged to restrict the power by terminating the power transfer operation, and specifically may be arranged to exit the power transfer phase/mode in response to the detection that the first temperature exceeds the reference temperature.

In some embodiments, the controller may restrict the power by applying an upper limit to the power of the power transfer signal.

In many embodiments, the controller may be arranged to both restrict the power and to generate the user alert in response to the first temperature exceeding the reference temperature.

The first temperature may be received from an external or interval source.

The first temperature may be a measured temperature. In accordance with an optional feature of the invention, the power receiver comprises a second a temperature sensor arranged to measure the first temperature.

The first temperature may reflect a measurement of a temperature, and may for example directly be the measured temperature or a temperature derived from a measured temperature. The first temperature may reflect current conditions, and the apparatus may in many embodiments be arranged to detect and react to dynamic changes. For example, it may detect undesired user action that results in the first temperature exceeding a specific reference temperature.

In accordance with an optional feature of the invention, the first temperature is a predetermined maximum temperature of the contact surface.

This may allow an improved user experience and/or reduced complexity in many embodiments. The predetermined maximum temperature may be a temperature linked to the specific powered device. The reference temperature may specifically be a predetermined maximum temperature of an external surface of the part of a powered device, and specifically of a surface for contacting to a receiving surface of the power transmitter entity.

In accordance with an optional feature of the invention, wherein the controller is arranged to restrict the power of the power transfer signal in response to the first temperature exceeding the first reference temperature.

This may provide improved operation in many embodiments and may in particular allow the system to address potential situations where a user action may result in potential damage to parts of the power transmitter entity.

In accordance with an optional feature of the invention, the controller is arranged to generate the user alert in response to the first temperature exceeding the first reference temperature.

This may provide improved operation in many embodiments and may in particular allow the system to aid or control the user to prevent or address potential situations where a user action may result in potential damage to parts of the power transmitter entity.

In accordance with an optional feature of the invention, the first part is a different part of the powered device than the heating part.

In accordance with an optional feature of the invention, the receiver, comparator and controller are comprised in the power transmitter.

This may provide advantageous operation in many embodiments, and may specifically allow the power transmitter to safeguard against undesirable situations and potential damage.

In accordance with an optional feature of the invention, the receiver is arranged to receive the first temperature from the power receiver.

This may provide improved performance in many embodiments and scenarios. In particular, a more accurate operation can be achieved in many scenarios. In some embodiments, reduced complexity and flexibility can be achieved.

The first temperature may e.g. be received during a power transfer phase.

In accordance with an optional feature of the invention, the controller is arranged to restrict the power of the power transfer signal or to generate a user alert in response to the receiver not receiving the first temperature from the power receiver.

The controller may be arranged to determine if a first temperature message has been received from the power receiver within a time interval during power transfer; and to at least one of generating a user alert and restricting power transfer if no first temperature message has been received within the time interval, and to not generate a user alert and not restrict power transfer if a first temperature message has been received comprising a value for the first temperature not exceeding the first reference temperature.

This may provide more reliable and/or safe operation in many embodiments.

In many embodiments, the controller may be arranged to both restrict the power and to generate the user alert in response to not receiving a first temperature from the power receiver (e.g. within a given time interval).

In accordance with an optional feature of the invention, the power transmitter is arranged to transmit an indication of a detection of the first temperature exceeding the first reference temperature to the power receiver.

This may allow enhanced functionality and/or an improved user experience in many embodiments. For example, it may allow the user alert to be generated in the powered device (such as a heatable pan) rather than by the power transmitter. This may for example generate a more noticeable user alert which will typically be generated closer to the user.

In accordance with an optional feature of the invention, the wireless power transfer system comprises a second power transmitter; and the apparatus further comprises: a second receiver for receiving a second temperature for a part of a second powered device, the second powered device being powered by a second power receiver powered by the second power transmitter; a second comparator for comparing the second temperature to a second reference temperature associated with the second power transmitter; and a second controller for at least one of restricting a power of a power transfer signal of the second power transmitter and generating a user alert in response to the second temperature exceeding the second reference temperature; wherein the second reference temperature is different from the first reference temperature.

This may for example allow a flexible arrangement where precautions can be adapted to specific properties of individual parts/surfaces of the apparatus that may come into contact with the powered device. For example, a kitchen appliance may be arranged to provide power to a range of powered devices and the approach may allow individual adaptation to the specific characteristics of different parts of the appliance.

In some embodiments, the apparatus may comprise a selector for selecting the reference temperature from a plurality of reference temperatures in response to a position indication for the power receiver, each reference temperature being associated with a set of positions.

Each set of positions may correspond to a surface area of an entity comprising the power transmitter, or may e.g. be a different part or element of the entity.

In some embodiments, the entity may comprise a plurality of transmit coils or power transmitters and each set of positions may be associated with a subset of the transmit coils or power transmitters. The position indication may be an indication of which transmit coil or power transmitter is powering the powered device or (often equivalently) of which transmit coil or power transmitter is in communication with the power receiver.

In accordance with an aspect of the invention, there is provided a power receiver for a wireless power transfer system further including a power transmitter arranged to generate a wireless inductive power transfer signal for powering the power receiver, the power receiver comprising: a receiver for receiving a first temperature for a first part of a powered device, the powered device comprising a heating part capable of being heated by power from the power transfer signal and the first part being a contact surface of the powered device for contacting the power transmitter; a comparator for comparing the first temperature to a first reference temperature, the first reference temperature being indicative of a maximum allowable contact temperature for a surface of the power transmitter for receiving the power receiver; a controller for at least one of restricting the power of the power transfer signal and generating a user alert in response to the first temperature exceeding the first reference temperature; a first temperature sensor for determining a second temperature for a heating part of the powered device; a transmitter for transmitting power control loop feedback messages for requesting power level changes of the power transfer signal to the power transmitter during power transfer; and a power controller for generating power change requests for the power control loop feedback messages in response to the second temperature.

In accordance with an optional feature of the invention, the controller is arranged to generate power down requests for the power control loop feedback messages in response to the first temperature exceeding the first reference temperature.

This may provide improved operation in many embodiments, and may in particular provide a more accurate heating by the powered device. The approach may allow both accurate heating and safe operation while maintaining low complexity.

In some embodiments, the apparatus may comprise a transmitter for transmitting a power transfer restriction request to the power transmitter in response to a detection that the first temperature exceeds the reference temperature.

In accordance with an optional feature of the invention, the power receiver further comprises a reference temperature receiver for receiving the first reference temperature from the power transmitter.

This may provide improved operation and/or implementation.

In accordance with an optional feature of the invention, the comparator is arranged to set the first reference temperature to a predetermined value in the absence of the first reference temperature being received from the power transmitter.

This may provide improved operation in many embodiments. It may for example allow the power receiver to ensure that it operates in a safe scenario even if not controlled by a power transmitter.

In accordance with an optional feature of the invention, the heating part comprises an inductive heating element arranged to be heated by induction from the power transfer signal.

The heating element may specifically be a heating plate.

According to an aspect of the invention there is provided a method of operation for a wireless power transfer system including a power transmitter and a power receiver, the power transmitter being arranged to generate a wireless inductive power transfer signal for powering the power receiver, the method comprising: receiving a first temperature for a first part of a powered device, the powered device comprising a heating part capable of being heated by power from the power transfer signal; comparing the measured temperature to a first reference temperature, the first reference temperature being indicative of a maximum allowable contact temperature for a surface of the power transmitter for receiving the power receiver; and at least one of restricting the power of the power transfer signal and generating a user alert in response to the first temperature exceeding the first reference temperature; a temperature sensor of the power receiver determining a second temperature for a heating part of the powered device, the power receiver transmitting power control loop feedback messages for requesting power level changes of the power transfer signal to the power transmitter during power transfer, and the power receiver generating power change requests for the power control loop feedback messages in response to the second temperature.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 8 illustrates an example of a power transfer scenario in accordance with some embodiments of the invention.

DETAILED DESCRIPTION OF SOME EMBODIMENTS OF THE INVENTION

Figure 1:
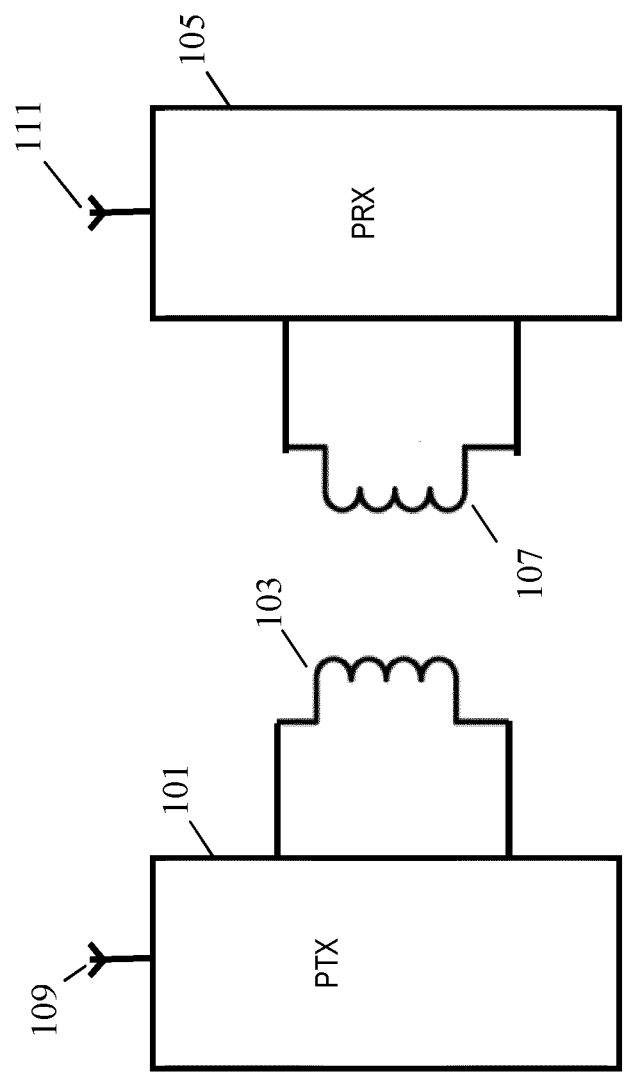
FIG. 1 illustrates an example of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides a wireless inductive power transfer from the power transmitter 101 to the power receiver 105. Specifically, the power transmitter 101 generates a power transfer signal, which is propagated as a magnetic flux by the transmitter coil 103. The power transfer signal may typically have a frequency between around 20 kHz to 200 kHz. The transmitter coil 103 and the receiver coil 105 are loosely coupled and thus the receiver coil picks up (at least part of) the power transfer signal from the power transmitter 101. Thus, the power is transferred from the power transmitter 101 to the power receiver 105 via a wireless inductive coupling from the transmitter coil 103 to the receiver coil 107. The term power transfer signal is mainly used to refer to the inductive signal between the transmitter coil 103 and the receiver coil 107 (the magnetic flux signal), but it will be appreciated that by equivalence it may also be considered and used as a reference to the electrical signal provided to the transmitter coil 103, or indeed to the electrical signal of the receiver coil 107.

In the following, the operation of the power transmitter 101 and the power receiver 105 will be described with specific reference to an embodiment in accordance with the Qi standard (except for the herein described (or consequential) modifications and enhancements). In particular, the power transmitter 101 and the power receiver 103 may substantially be compatible with the Qi Specification version 1.0 or 1.1 (except for the herein described (or consequential) modifications and enhancements).

To prepare and control the power transfer between the power transmitter 101 and the power receiver 105 in the wireless power transfer system, the power receiver 105 communicates information to the power transmitter 101. Such communication has been standardized in the Qi Specification version 1.0 and 1.1.

On the physical level, the communication channel from the power receiver 105 to the power transmitter 101 is implemented by using the power transfer signal as carrier. The power receiver 105 modulates the load of the receiver coil 105. This results in corresponding variations in the power transfer signal at the power transmitter side. The load modulation may be detected by a change in the amplitude and/or phase of the transmitter coil 105 current, or alternatively or additional by a change in the voltage of the transmitter coil 105. Based on this principle, the power receiver 105 can modulate data which the power transmitter 101 demodulates. This data is formatted in bytes and packets. More information can be found in the "System description, Wireless power Transfer, Volume I: Low Power, Part 1: Interface Definition, Version 1.0 July 2010, published by the Wireless power Consortium" available via http://www.wirelesspowerconsortium.com/downloads/wireless-power-specification-part-1.html, also called the Qi wireless power specification, in particular chapter 6: Communications Interface.

To control the power transfer, the system may proceed via different phases, in particular a selection phase, a ping phase, identification and configuration phase, and a power transfer phase. More information can be found in chapter 5 of part 1 of the Qi wireless power specification.

Initially, the power transmitter 101 is in the selection phase wherein it merely monitors for the potential presence of a power receiver. The power transmitter 101 may use a variety of methods for this purpose, e.g. as described in the Qi wireless power specification. If such a potential presence is detected, the power transmitter 101 enters the ping phase wherein a power transfer signal is temporarily generated. The power receiver 105 can apply the received signal to power up its electronics. After receiving the power transfer signal, the power receiver 105 communicates an initial packet to the power transmitter 101. Specifically, a signal strength packet indicating the degree of coupling between power transmitter and power receiver is transmitted. More information can be found in chapter 6.3.1 of part 1 of the Qi wireless power specification. Thus, in the Ping phase it is determined whether a power receiver 105 is present at the interface of the power transmitter 101.

Upon receiving the signal strength message, the power transmitter 101 moves into the Identification & Configuration phase. In this phase, the power receiver 105 keeps its output load disconnected and communicates to the power transmitter 101 using load modulation. The power transmitter provides a power transfer signal of constant amplitude, frequency and phase for this purpose (with the exception of the change caused by load-modulation). The messages are used by the power transmitter 101 to configure itself as requested by the power receiver 105.

Following the Identification and Configuration phase, the system moves on to the power transfer phase where the actual power transfer takes place. Specifically, after having communicated its power requirement, the power receiver 105 connects the output load and supplies it with the received power. The power receiver 105 monitors the output load and measures the control error between the actual value and the desired value of a certain operating point. It communicates such control errors to the power transmitter 101 at a minimum rate of e.g. every 250 ms to indicate these errors to the power transmitter 101 as well as the desire for a change, or no change, of the power transfer signal.

Thus, during the power transfer phase, the power receiver controls the provided power. This may be particularly important for embodiments wherein the power receiver does not directly provide power to an external load but with the receive coil 107 effectively being the load itself. For example, for a powered device which is a heatable device which is heated by the power transfer signal, the receive coil 107 may be implemented as an inductive heating element arranged to be heated by induction from the power transfer signal. For example, the power receiver may include a heating plate in which the power transfer signal generates eddy currents by induction. The heating element will thus heat up in the presence of the power transfer signal and the heating element can be used to heat other items. For example, the powered device may be a kettle or a pan comprising a heat element which is heated by eddy currents generated by the power transfer signal. The heated element may thus be considered to form both the receive coil 107 and the load.

The powered device is thus a powered heating device comprising a heating part, such as a heating element e.g. in the form of a heating plate. In the example, the power transfer signal may directly heat the heating part by inducing eddy currents in this. In other embodiments, the provision of power from the power transfer signal to the heating part may include intermediate functions. For example, in some embodiments the powered device may include a separate receive coil 107 in the form of an inductor in which current is induced. This induced power may be converted into an electrical signal which is fed to the heating part. Thus, the heating part may electrically be connected as a conventional load to a wireless power receiver.

In the system, the power control operation is based on a temperature sensor of the power receiver 105. In particular, the power receiver comprises a heating part temperature sensor which determines a temperature for the heating part, henceforth referred to as the heating part temperature. The power receiver 105 is arranged to determine desired power changes based on the heating part temperature. Specifically, if the heating part temperature is below a first threshold, the power receiver 105 may request an increase of power of the power transfer signal, and if the heating part temperature is above a second threshold (higher or equal to the first threshold), the power receiver 105 may request a decrease of power of the power transfer signal. The power receiver 105 may then generate corresponding power control loop feedback messages and transmit these back to the power transmitter 101. In response, the power transmitter 101 increases or decreases the power of the power transfer signal.

Thus, in the system of FIG. 1, the power control operation is temperature based and may directly be used to control the operating temperature of the heating part, and thus may control the heating operation of the powered heating device.

Wireless power transfer such as that provided by Qi power transfer systems is becoming increasingly popular and may increasingly be used in different applications and different contexts, and with an increased variety of setups, equipment, surroundings etc. The current Qi system provides support for efficient power transfer, and the intended enhancements and developments are aimed at providing an improved functionality and user experience in a wider range of applications. However, there is a general desire to further improve the functionality, flexibility and user friendliness to allow an increased uptake of wireless power transfer. Specifically, the increase to higher powers and a greater variety of applications result in an increased desire and need for ensuring that the system operates safely and without freely allowing unintended and undesired results or scenarios arising.

Figure 2:
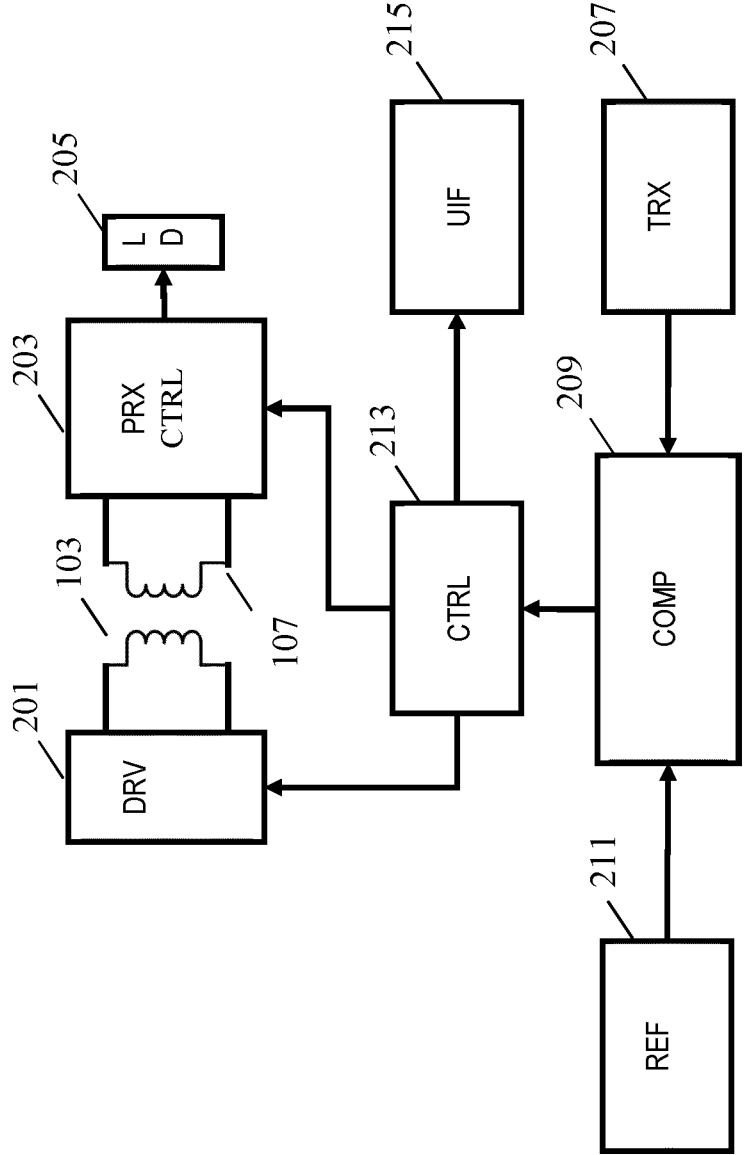
FIG. 2 illustrates an example of a power transfer system in accordance with some embodiments of the invention.

FIG. 2 illustrates a wireless power transfer system that may provide enhanced functionality and/or operation. The system of FIG. 2 may specifically illustrated enhanced control functionality employed in the system of FIG. 1.

Thus, the system of FIGS. 1 and 2 utilize a temperature based power control loop to control the temperature of a heating part of a powered heating device. The power control loop is accordingly used to control the operating temperature of the heating part, and thus to control the heating performance of the powered heating device.

In addition to this temperature based power control loop, the system is arranged to evaluate a temperature of a part of the powered device (such as an external contact surface) relative to a reference temperature associated with the power transmitter. Thus, the system specifically considers the relationship between two temperatures where one relates to the power receiver side and another relates to the power transmitter side of the power transfer. The reference temperature is dependent on a characteristic which is associated with the power transmitter and which will typically be the same regardless of which (or if any) power receiver is present. Conversely, the first temperature is typically not dependent on the characteristics of the power transmitter the power receiver is used with but relates to characteristics of the device which is powered by the power receiver (the powered device). Typically, the first temperature may be a dynamically measured temperature whereas the reference temperature is often a predetermined value.

The reference temperature is specifically a maximum acceptable temperature for a contact surface of an appliance comprising the power transmitter. The reference temperature may be a maximum allowable temperature for a surface for receiving the powered device during power transfer. The surface may for example be a flat surface of the power transmitter on which the powered device is put for power transfer operations, i.e. when a power transfer is desired.

The first temperature specifically indicates the current temperature of a part of the power receiver that will come into contact with the contact surface when the powered device is placed on the contact surface. Indeed, the first temperature is provided for a contact surface of the powered device for contacting the power transmitter. Thus, the reference temperature and first temperature may be indicative of temperatures (e.g. the maximum allowable and the measured temperature) of contact surfaces of respectively the power transmitter and the powered device which will come into contact with each other during power transfer.

The system is arranged to detect if the first temperature exceeds the reference temperature. Specifically, if the current temperature of the contact surface of the powered device is higher than a maximum allowable surface temperature of a contact surface on which the powered device may be positioned during power transfer, this will be detected by the system.

FIG. 2 illustrates a driver 201 which is coupled to the transmit coil 103 and which generates the power transfer signal and provides this to the transmit coil 103. Thus, during power transfer, the driver 201 provides the power transfer signal to the power receiver 105 via the transmit coil 103 (and the receive coil 107).

Figure 3:
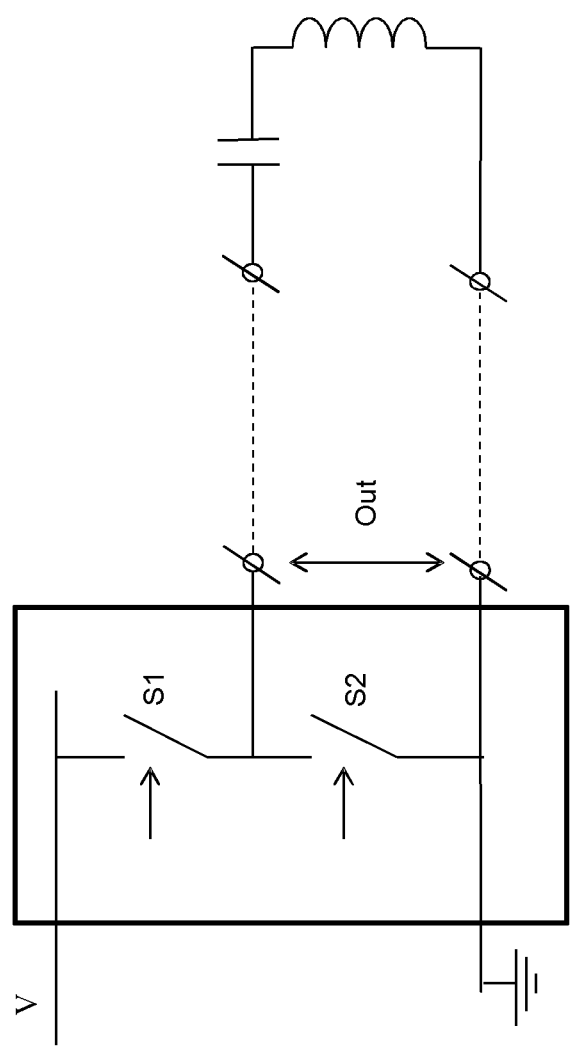
FIG. 3 illustrates an example of elements of a half-bridge inverter for a power transmitter in accordance with some embodiments of the invention.
Figure 4:
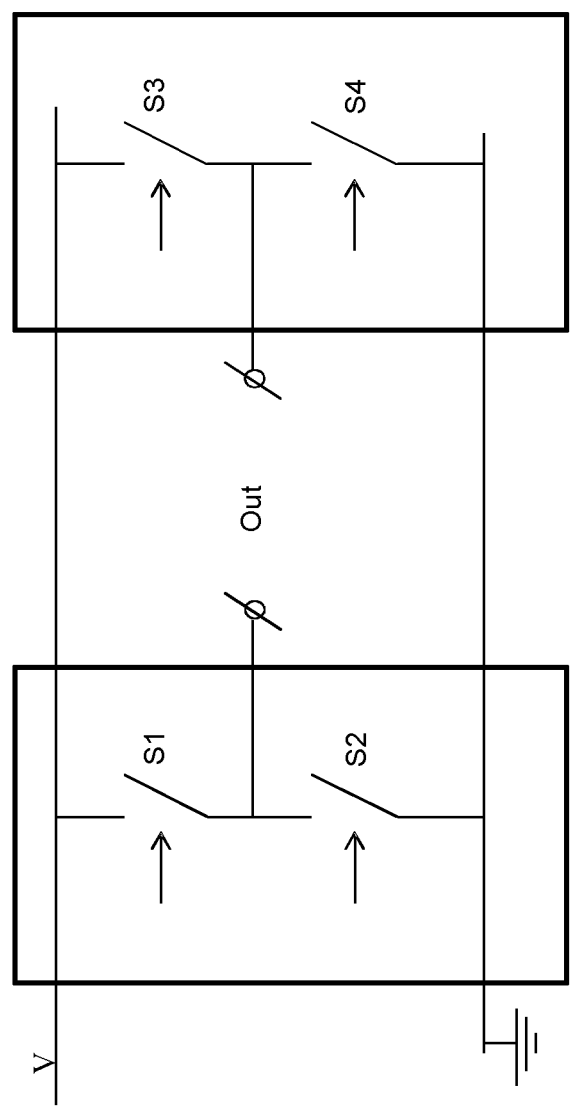
FIG. 4 illustrates an example of elements of a full-bridge inverter for a power transmitter in accordance with some embodiments of the invention.

The driver 201 thus generates the current and voltage which is fed to the transmitter coil 103. The driver 201 is typically a drive circuit in the form of an inverter which generates an alternating signal from a DC Voltage. FIG. 3 shows a half-bridge inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter coil via a resonance capacitor. FIG. 4 shows a full-bridge inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a block-wave signal at the output. The switches are open and closed with the desired frequency.

The driver 201 also comprises control functionality for operating the power transfer function and may specifically comprise a controller arranged to operate the power transmitter 101 in accordance with the Qi standard. For example, the controller may be arranged to perform the Identification and Configuration as well as the power transfer phases of the Qi standard.

The receiver coil 107 is coupled to a power receiver controller 203, which comprises various functionality for operating the power transfer function, and is in the specific example arranged to operate the power receiver 105 in accordance with the Qi standard. For example, the power receiver controller 203 may be arranged to perform the Identification and Configuration as well as the power transfer phases of the Qi standard.

The power receiver controller 203 is arranged to receive the power transfer signal and to extract the power during the power transfer phase. The power receiver controller 203 is coupled to a power load 205 which is the load powered from the power transmitter 101 during the power transfer phase. The power load 205 may specifically be a heating part, such as a heating element heated by power extracted from the power transfer signal.

In many embodiments, the powered device may comprise a heating element which is directly heated by the power transfer signal inducing eddy currents in the heating element. Thus, the load 205 and receive coil 107 may be integrated into one single element with the load being powered directly without the power receiver controller 203 as an intermediate. In such embodiments, the power receiver controller 203 may however provide the required control and interfacing technology including communicating with the power transmitter, controlling the power as part of the power control loop etc.

The power controller 203 may further control the power control operation based on the measurement of the heating part temperature. Specifically, it may generate power requests which are transmitted to the power transmitter 101 in power control loop feedback messages. E.g. if the heating part temperature is below a threshold, an increase in the power of the power transfer signal is requested, and if it is above the threshold a decrease in power is requested. Thus, the power receiver controller 203 can control the operating temperature of the heating part/element.

The system of FIG. 2 provides enhanced functionality by providing an additional control of the operation, and especially functionality that in many embodiments may prevent undesired and potentially damaging scenarios from occurring. In particular, the system allows the operation to be adapted based on a temperature of a part of the powered device relative to a reference temperature which reflects a characteristic of the power transmitter such as a device, appliance or other entity of which the power transmitter functions are a part of. Specifically, the entity may be an entity, device, or object comprising the functions of the power transmitter 101. The use of a power control loop to control the operating temperature of the heating part combined with a separate temperature control function which is based on comparison of temperatures of respectively the power transmitting and the power receiving sides provides efficient operation and additional safety. It may provide additional flexibility in allowing different types of power receivers and power transmitters to flexibly interwork without requiring the thermal compatibility to be designed for worst case combinations.

The system of FIG. 2 comprises a temperature receiver 207 which receives a temperature, henceforth referred to as the first temperature. The first temperature may be received from any suitable internal or external source.

The first temperature is indicative of a temperature of a contact surface of the powered device which is arranged for contacting the power transmitter. The contact surface of the powered device is often a bottom surface which is placed on a surface of the power transmitter to allow the power transmission. Thus, typically the power transfer signal is provided to the power receiver 105 from the power transmitter 101 via the contact surface of the power transmitter 101 for which the first reference temperature is provided and the contact surface of the power receiver 105 for which the first temperature is provided. The two contact surfaces are accordingly in contact during power transfer (in typical use).

The first temperature is in many embodiments indicative of measured temperature but may in some embodiments be indicative of an estimated or maximum operating temperature of the part. The part is typically be an external part, and the first temperature may specifically be indicative of a current temperature of a surface of the powered device. The surface is typically a contact surface which comes into contact with a contact surface of the power transmitter during normal power transfer operations.

The temperature receiver 207 is coupled to a comparator 209 which is further coupled to a reference source 211 that provides a reference temperature to the comparator 209. The reference temperature is associated with the power transmitter 101 and specifically indicates a maximum allowable contact temperature for a surface for receiving the powered device. The surface may specifically be a surface through which the powered device is powered, such as the surface of an object comprising the power transmitter 101 and on which the powered device may be positioned for power transfer.

The comparator 209 is arranged to compare the measured temperature to a reference temperature associated with the power transmitter 101. The comparator 209 is coupled to a first controller 213 which is provided with the result of the comparison.

The first controller 213 is arranged to react to a detection that the first temperature exceeds the reference temperature. Specifically, if the comparator 209 indicates that the first temperature exceeds the reference temperature, the first controller 213 may proceed to restrict the power of the power transfer signal. The restriction may specifically be by terminating the power transfer, exiting the power transfer phase/mode, or e.g. by reducing the power of the power transfer signal by a given amount, or restricting it to not exceed a given threshold.

In some embodiments (particularly when the first controller 213 is implemented in the power transmitter 101, the first controller 213 may restrict the power by modifying the operation of the power transmitter 101, and specifically by modifying the operation of the driver 201. In other embodiments (particularly when the first controller 213 is implemented in the power receiver 105), the first controller 213 may modify the operation of the power controller 203. For example, the power loop control operation may be modified such that the power receiver 105 continuously transmits power down requests until the first temperature no longer exceeds the reference temperature (typically with a margin). Thus, in this case the first controller 213 may proceed to transmit power down requests even when the heating part temperature falls below the lower threshold for requesting increased power.

Alternatively or additionally, the first controller 213 may generate a user alert. The first controller 213 is specifically coupled to a user interface 215 which may be controlled by the first controller 213 to provide a user alert. The user alert may for example be a visual indication (e.g. flashing light) or an audio indication (e.g. a warning tone). In some embodiments, more complex user alerts may be generated, such as a text or graphical user display describing the cause of the user alert.

Thus, the system of FIG. 2 may detect that a temperature of a part of the powered device exceeds a temperature suitable for the power transmitter 101. For example, the system may detect that a first temperature, reflecting a temperature of a contact surface of the powered device, exceeds a reference temperature representing a maximum allowable contact temperature for a particular contact surface of the power transmitter. Accordingly, it may detect that if the powered device is positioned on the particular surface of the power transmitter, damage to this surface could occur. The system may address such risks by generating a user alert (possibly before the powered device is positioned on the surface) or/and reducing or switching off the power (typically when the powered device is positioned on the surface).

The approach thus provides an additional control option that allows the system to detect potentially undesired scenarios and to take action to avoid these or to mitigate the consequences.

In the system of FIGS. 1 and 2, a wirelessly powered device comprises a heating part that is powered by a power transfer signal generated by a power transmitter. The power receiver includes a temperature sensor which determines a temperature of the heating part, and a power controller which generates power control loop feedback messages based on the determined temperature. The power receiver comprises a transmitter for transmitting the feedback messages to the power transmitter.

Thus, a power control loop can be implemented which allows the power transmitter 101 to control the generated power transfer signal to provide an appropriate amount of power to the power receiver 103. The power is controlled on the basis of a temperature of the heating part of the powered device and accordingly the power control loop can specifically control the power of the power transfer signal to generate a desired temperature of the heating part.

In addition to this temperature controlled power control loop, the system is arranged to also consider another temperature of a part of the powered device. This temperature (the first temperature) is specifically compared to a reference temperature which represents a maximum allowable contact temperature for a surface of the power transmitter for receiving the power receiver. Thus, in addition to the temperature based power control loop, which specifically can be used to maintain a desired temperature of the heating part/element of the powered device, the system includes functionality for comparing another temperature of a part of the powered device to a maximum allowable temperature for the contact surface of the power transmitter 101 that is arranged to receive the power receiver 105. This second temperature (the heating part temperature) relates to the contact surface of the powered device which will contact the power transmitter 101. If the temperature of this part of the powered device exceeds the maximum contact temperature, the system restricts the power of the power transfer signal or generates a user alert.

This second temperature control does not merely correspond to a conventional temperature control seeking to control an operating temperature of a heating element to have a desired value. Indeed, a standard temperature control will typically be based on increasing or decreasing transmitted power in response to the powered device comparing a measured temperature to a local temperature reference reflecting the desired temperature. However, rather than merely setting a preferred operating temperature, the second temperature control is concerned with the interoperation between the power transmitter and the powered device. Indeed, the second temperature control is directed to comparing a temperature characteristic of the powered device to a temperature characteristic of the power transmitter. Thus, it is not merely directed to providing a desired temperature for a heating element but rather is a relative comparison between values representing different devices. It can use this to detect whether the power transmitter and the powered device operate in a way that is compatible with each other.

For example, a power transmitter may be provided e.g. in a kitchen environment where devices to be powered (e.g. kitchen appliances) can be positioned directly on the worktop surface through which the power transfer signal is transmitted. This power transmitter may be used with a range of different appliances, and many different powered devices may be positioned on the work surface. Different devices will typically have different requirements and will also have different temperature characteristics.

When a powered heating device is positioned on the work surface, the power transmitter may provide a power transfer signal which results in the desired heating in the heating part/element. The power of the power transfer signal can be controlled via a power control loop, and this power control loop can be standardized. Accordingly, a powered heating device can control the power of the power transfer signal to provide the desired operating temperature of the heating element. The power control loop can maintain this temperature by requesting that the power of the power transfer signal is increased or decreased.

As the power control loop can be standardized, this approach can be used with all powered heating devices and with all power transmitters that are compatible with the standard. Indeed, the same power control messages as for non-heated powered devices can be used. However, whereas this approach and standardization ensures operational compatibility between all power transmitters and powered devices of the standard, it does not address all issues.

The Inventors have realized that one problem of such powered heating devices is that the powered heating device may potentially generate temperatures that could damage the power transmitter. In order to prevent a heating device from damaging surfaces, the surfaces are made by materials that are heat resistant and are capable of withstanding any temperature that may be encountered by any heating device. Such an approach puts restrictions on both the materials of the surfaces and the heating elements.

However, in the approach of FIGS. 1 and 2, the second temperature control can be used to dynamically measure thermic compatibility between the contact surface of the power transmitter 101 and the corresponding temperature of the powered heating device. This may provide an increased design freedom for manufacturers of both power transmitters and powered heating device while at the same time preventing damage. In particular, it may remove the need for manufacturers to design all products to be capable of handling all worst-case scenarios.

The approach may for example allow a range of power transmitters to be developed in accordance with a standard but while allowing the power transmitters to use various materials for the contact surfaces to power receivers. The different materials can have different thermal resistances (in particular in the sense of being able to withstand heat without damage). At the same time, a range of powered heating devices may be developed in accordance with the standard where the different heating devices having different thermal properties, and specifically with different heating devices exhibiting different temperature characteristics in different scenarios. Despite all devices being compatible with the standard, it is not required that all powered heating devices are thermally compatible with all power transmitters. Rather, it may be allowed that some combinations of powered heating devices and power transmitters could potentially result in situations where the powered heating device could cause damage to a contact surface of the power transmitter.

As an example, a range of power transmitters for kitchen applications may include one implemented with a wooden contact surface and another with a granite contact surface, such as e.g. a wooden or granite kitchen worktop. A range of powered heating devices may e.g. include a kettle where the heating element is comprised inside a thermally insulating material (resulting in low temperature of the part that is placed on the work surface). However, in order to improve power transfer, another kettle may have the heating element exposed and indeed in direct contact with the worktop. The first kettle may be used with both worktops whereas the last kettle can only be used with the granite contact surface/worktop. Although a user could manually restrict operations to be between compatible products, inevitable mistakes (e.g. when used by the elderly) can result in potential damage to the worktop.

In the approach of the system of FIGS. 1 and 2, any such incompatibility between a power receiver and a power transmitter can be detected automatically and in response the power of the power transfer signal may be restricted or a user alert (e.g. alarm signal) can be generated.

The approach is based on comparing thermal characteristics of the power transmitter to thermal characteristics of the power receiver and this comparison allows the system to detect a potentially undesirable situation. Comparison of values representing properties of different devices is thus employed.

Specifically, the system compares a temperature which is individual to the power receiver (and is not inherently known by the power transmitter) to a property (the maximum allowable contact temperature for a surface of the power transmitter for receiving the power receiver) which is individual to the power transmitter (and is not inherently known by the power receiver). The comparison is of temperature characteristics of two different devices and reflect properties of two devices.

The approach may allow an automated detection of thermal incompatibility between a power transmitter and power receiver. By including such a compatibility check, the system accordingly allows for e.g. a common standard to be developed which provides increased design flexibility by allowing the possibility of thermally incompatible power receivers and powered devices.

The two temperature controls can accordingly support different functions and provide an overall improved operation. Specifically, the temperature controlled power control loop may control the heating part to have a desired operating temperature, and thus may provide a flexible control of the operating point to provide a desired temperature performance. The temperature controlled power control loop can specifically address the operational requirements during heating and can ensure that the desired heating is provided by the heating part. In addition to this operational control, the second temperature control can ensure that the devices are thermally compatible. Thus, whereas the first temperature control can be directed to controlling the heating performance of the specific pairings of power transmitters and powered devices, the second temperature can address uncertainty resulting from there being many possible combinations of power receivers and power transmitters, including some combinations that are not thermally compatible. Such combinations may include scenarios wherein a setting within a normal operating range for the power receiver will result in damage to a contact surface of the power transmitter. The system can provide an additional safety protection and thereby allow substantially more design flexibility. In the following, the approach will be exemplified with focus on a specific embodiment wherein a kitchen appliance/unit/object/element is arranged to provide wireless power to a plurality of different powered devices, each of which comprises a power receiver. The powered devices may thus specifically be kitchen appliances such as kettles, pans, pots, blenders, etc.

A specific exemplary application will be described wherein a kitchen unit may comprise two zones for food processing, namely:

1. A cooking zone. This zone may comprise e.g. an inductive cooking stove on which pans, pots, kettles etc. may be heated. The zone provides a number of transmit coils each of which can power a powered device, which specifically may be a heatable kitchen appliance such as a kettle, pan etc. The powered devices may specifically comprise a heating element in which heating is achieved by the induction of eddy currents. The heatable powered devices may become very hot and indeed the external parts and contact surfaces of the powered devices may become very hot. Accordingly, the zone is generated to be able to withstand high temperatures, such as typically to withstand temperatures up to at least 200° C. Accordingly, the heatable devices can be heated to a high temperature while being positioned somewhere in the cooking zone. The user may control the heating via a suitable user interface, and control functionality in the appropriate power receiver and power transmitter may ensure appropriate power transfer and heating (e.g. using the feedback power loop).

2. Preparation zone. The zone may also comprise a number of transmit coils which may power various powered devices by wireless power transfer. The powered devices may specifically be kitchen appliances such as blenders, mixers etc. However, in contrast to the cooking zone, the preparation zone is not designed for heating applications. Accordingly, the preparation zone is not designed to have a heat resistance, and typically the maximum acceptable contact temperature for an item positioned in the preparation zone is substantially lower than the temperature of contact surfaces of heatable kitchen appliances.

In both zones, a work surface may thus be provided which comprises power transmitter coils for wireless power transfer to powered devices that may be positioned on the work surface. However, whereas the cooking zone is intended for heatable devices and accordingly is designed to withstand high temperatures, the preparation zone is intended for power devices that are not intended for heating, and which accordingly are not expected to heat the work surface. Accordingly, the preparation zone work surface may not be designed to withstand high temperatures but may instead (e.g. for aesthetic design reasons) be made of materials that are sensitive to high temperatures.

The work surfaces of the preparation zone and the cooking zone may thus be constructed from different materials, such as e.g. ceramic or glass having relatively high temperature resistance or e.g. laminated wood with relatively high temperature vulnerability. Indeed, in some scenarios, the cooking zone may be made from material, which is sensitive to higher temperatures. Such units may allow heatable devices, which effectively isolate the contact surfaces from the heating element to be used while not allowing devices that do not provide such temperature isolation to be used.

Figure 5:
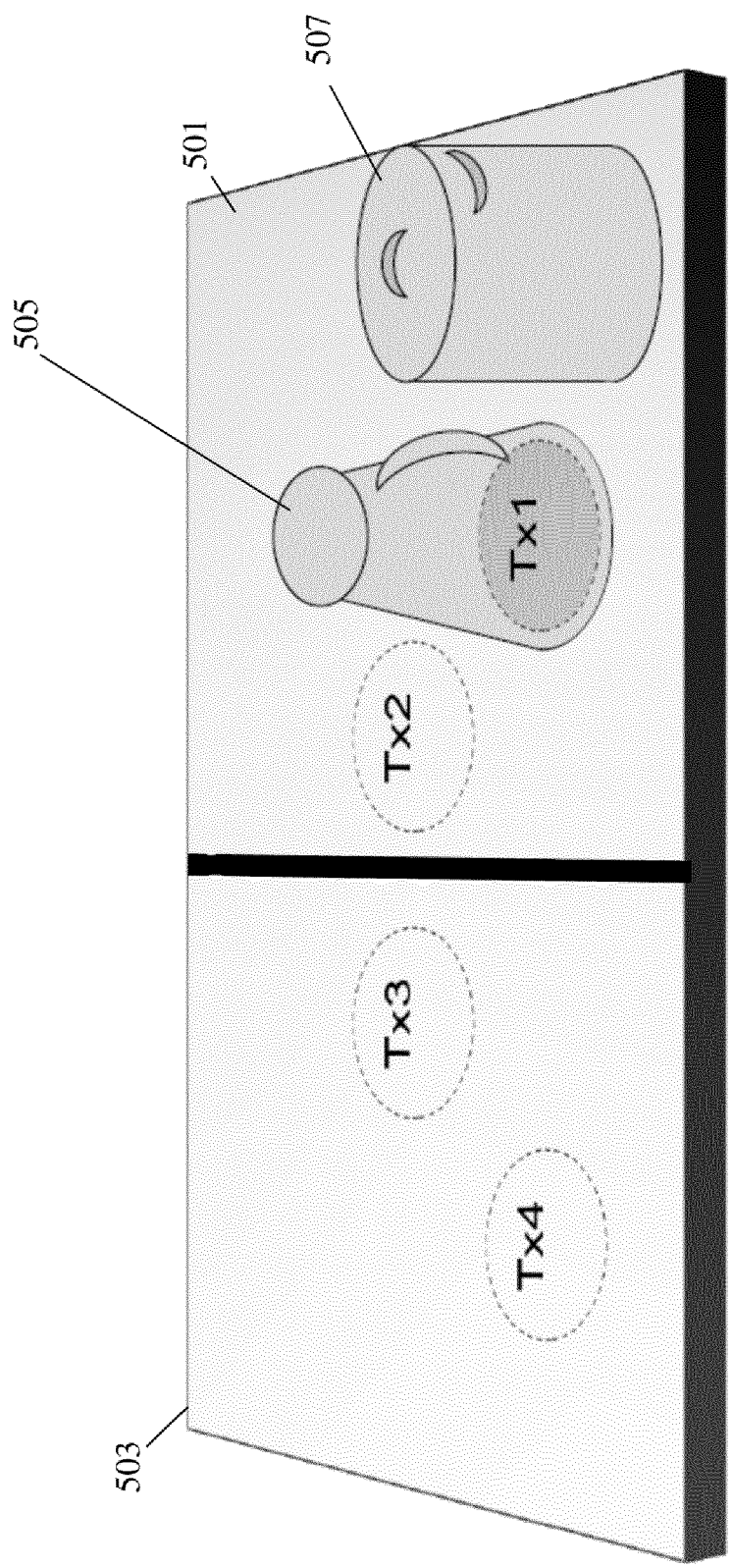
FIG. 5 illustrates an example of a unit for powering kitchen appliances.

An example of the exemplary kitchen scenario is provided in FIG. 5. In the example, a cooking zone 501 comprises two power transmitters Tx2, Tx1 and a preparation zone 503 comprises two power transmitters Tx4, Tx3. In the example, a kettle 505 is being powered by one of the power transmitters TX1 of the cooking zone 501. Accordingly, the temperature of the kettle 505 may be high. A pot 507 is also positioned on the work surface of the cooking zone but is not currently being powered and accordingly may not have a high temperature. In this scenario, it may be acceptable for a user to move the pot 507 to a part of the preparation zone 503 where it will not be powered (and thus not heated). However, if the kettle 505 was moved to the preparation zone 503, the temperature may exceed that which the material of the preparation zone 503 can withstand and this could result in damage.

Thus, whereas the approach of providing multiple power transmitters with different purposes may provide a number of advantages, it may also susceptible to potential undesired scenarios. For example, if a heatable device is positioned on a power transmitter of the preparation zone rather than one of the cooking zone, the devices may be heated to a temperature that will result in damage to the low temperature resistant work surface.

The example in FIG. 5 with a cooking zone and a food preparation may of course be extended to include further zones. It may for example be an advantage to have a zone at a table where users consume the food/drinks, or any other place where wirelessly powered devices may be placed.

The system of FIG. 2 may prevent or reduce the risk of such situations occurring while still allowing different materials to be used with different power transmitters/power transmitter coils.

For example, the power receiver may communicate the maximum temperature and/or the actual temperature of the base of the powered device to the power transmitter. The power transmitter may then on the basis of a comparison of the temperature that the work-surface can withstand (i.e. the reference temperature in the example) and the maximum temperature and/or actual temperature of the base of the powered device (i.e. the first temperature in the example) determine whether to allow power transmission and too which level. Thus, it may specifically prevent power transfer, or it may restrict the power level of the power transfer signal to a level that is known to not cause a temperature which exceeds the allowable temperature. If the power receiver does not provide any temperature data, the power transmitter may prevent power transfer.

The power transmitter may in some examples optionally inform the user of the status of the system. For example, it may provide user indications that indicate:

if it powers the appliance;
if the power level is reduced;
if the appliance is too hot for the work-surface (an alarm may be generated); and/or
the actual temperature of the base of the appliance.

In some embodiments, the system may not modify the power transfer, but may simply generate a user alert that can specifically indicate to the user that the specific powered device should not be used with the specific power transmitter. For example, the power transmitter may be one in the preparation zone, and if the power receiver is for a heatable device, a user alert may be generated if the user attempts to power it from a power transmitter of the preparation zone. The user may instead move the powered device to a power transmitter in the cooking zone. Thus, damage to the work surface of the preparation zone can be avoided.

The additional control functions described with reference to FIG. 2 may be implemented in different unit or elements in different embodiments. In particular, each of the individual functional blocks/features may (typically independently) be implemented in the power transmitter 101, the power receiver 105, or may be distributed between these.

Figure 6:
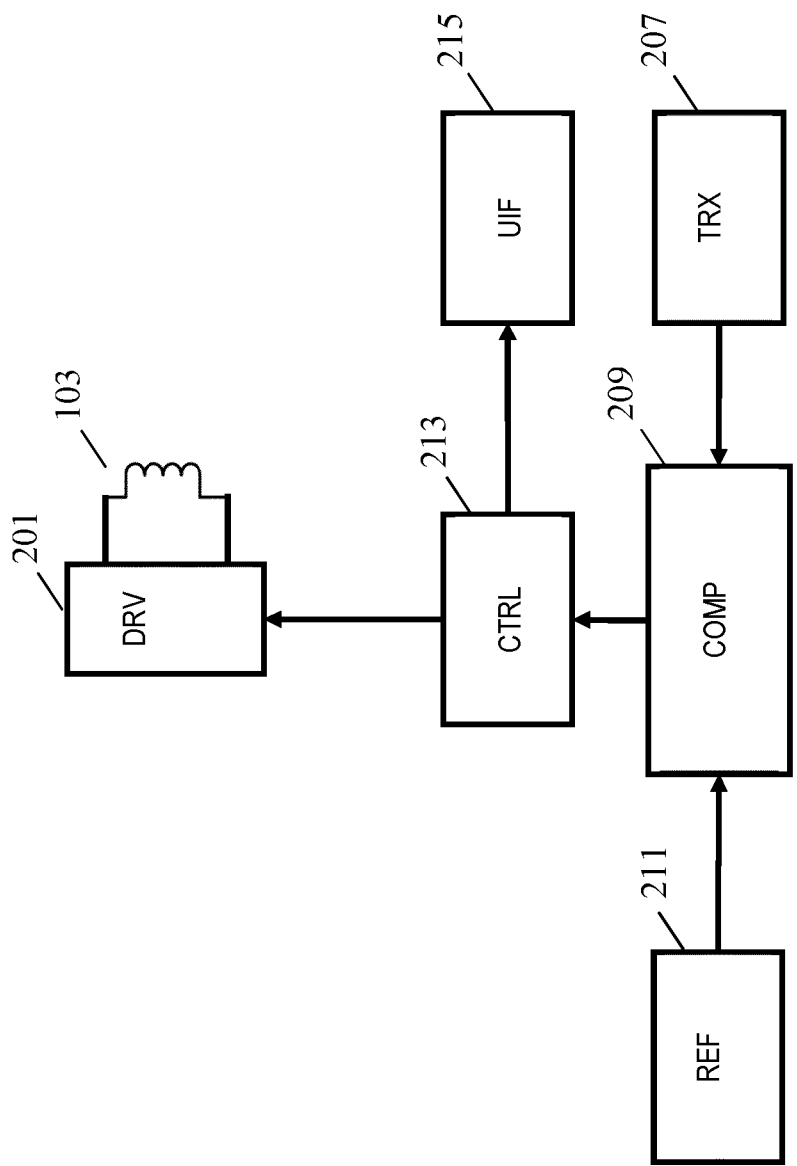
FIG. 6 illustrates an example of a power transmitter in accordance with some embodiments of the invention.

As an example, in some embodiments, the functionality may be implemented in the power transmitter 101. An example of a power transmitter 101 for such an embodiment is illustrated in FIG. 6. The example corresponds directly to the system of FIG. 2 but with the different additional control functions being illustrated as part of the power transmitter 101.

In the example, the power transmitter comprises the temperature receiver 207 which may receive the first temperature from an internal or external source. The power transmitter further comprises the comparator 209 as well as the reference source 211. Based on the comparison, the first controller 213 proceeds to control the power transfer via the driver 201 and/or generate a user alert via the user interface 215.

As an example of a system where the control functionality is provided in the power transmitter, the temperature receiver 207 may receive the first temperature from a first temperature sensor positioned on or very near the surface of the kitchen work surface such that it can measure the temperature of a powered device placed on the work surface. For example, the temperature sensor may be positioned on or very close to the surface at the position of a transmit coil of one of the power transmitters of the preparation zone. When a powered device is positioned on the power transmitter, the temperature sensor may come into contact with the bottom of the powered device thereby allowing it to measure the temperature of this contact surface.

The comparator 209 of the power transmitter 101 may compare this to a reference temperature which specifically may represent a maximum allowable contact temperature for the material of the work surface of the preparation zone. If the measured temperature exceeds that of the reference temperature, the power controller 303 of the power transmitter 101 proceeds to restrict or possibly terminate power transfer. Alternatively or additionally, the power controller 303 may control the user interface 215 to generate a user alert. For example, the kitchen unit including the power transmitter 101 may generate a visual or audio alarm.

In this way, the power transmitter 101 may accordingly comprise functionality that can prevent or reduce the probability of a powered device damaging the work surface of the preparation zone.

In many embodiments, the reference temperature may accordingly represent a maximum allowable contact temperature for a surface of an object comprising the power transmitter 101. The surface may specifically be an upper surface intended to receive power receivers for wireless power transfer. The first temperature may represent the maximum temperature that the work-surface can withstand.

This parameter can e.g. be determined during manufacture and thus may be a pre-configured temperature limit of the work-surface. As another example, it may be stored during installation such as e.g. by setting a dipswitch or via an installation interface. In some embodiments, the reference temperature may be a temperature limit which is determined by detecting the type of material of which the work-surface is made.

In most embodiments, the temperature receiver 207 is arranged to receive the first temperature from the power receiver 105.

The communication of the reference temperature to the power transmitter 101 may in some embodiments be via load modulation of the power transfer signal, such as e.g. is known from the Qi communication system. However, this communication requires the power transfer signal to be present and thus limits the communication to specific operational modes, such as e.g. to scenarios where an active power transfer is ongoing. Furthermore, load modulation may be susceptible to noise caused by load variations.

Therefore, in some embodiments, the first temperature may alternatively or additionally be communicated using a secondary communication system or channel (often referred to as out of band signaling). For example, in many embodiments, the power transmitter 101 and the power receiver 105 may comprise Near Field Communication (NFC) functionality allowing them to exchange data over a short range communication link.

NFC is a communication technique wherein the communication uses the near field generated by a transmitter antenna which typically is a (planar) coil. The receiver antenna (which also typically is a (planar) coil is positioned in the near field of the transmitter. The communication is a (very) short range communication with a range of typically no more than 10 cm and often only a few cm. A specific NFC system has been standardized by the NFC Forum and specific information may be found in the developed standard specifications, including for example ISO/IEC_18092, "Information technology—Telecommunications and information exchange between systems—Near Field Communication—Interface and Protocol (NFCIP-1)", Second edition, 15 Mar. 2013.

The use of a short range communication system with a communication range of no more than, say, 20 cm provides the advantage that if the first temperature can be communicated from the power receiver 105 to the power transmitter 101, then the power transmitter 101 will inherently be positioned very close to, and typically on the transmit coil, of the power transmitter 101. Thus, by using short range communication, the control functionality automatically controls the operation based on substantially co-located devices. For example, for a power transmitter located in the preparation zone, it can be assumed that if the first temperature can be received from a power receiver, then this power receiver must be positioned in the preparation zone.

In some embodiments, the first temperature is a predetermined maximum temperature of a surface of the powered device. The power receiver 105 may be arranged to transmit this predetermined maximum temperature to the power transmitter 101 which may proceed to compare this to the stored reference temperature.

The first temperature may thus in some embodiments be a predetermined maximum temperature rather than a measured temperature. The predetermined maximum temperature may be a temperature which reflects the maximum temperature that the surface can reach during (non-faulty) operation of the powered device. The maximum temperature may be dependent on the operation and control algorithm of the power receiver or may e.g. be dependent on the physical characteristics of the power receiver as well as the maximum power which can be provided by the power transmitter (e.g. as limited by the standards or specifications of the wireless transfer system). The predetermined maximum temperature may e.g. be determined during the manufacturing or design phase for the powered device and may be stored in the power receiver.

The comparator 209 may then compare the received predetermined maximum temperature to a reference temperature reflecting the maximum allowable temperature of a surface for receiving the powered device. If the predetermined maximum temperature received over the short-range communication link (or by load modulation for an active power transfer) exceeds the reference temperature for the surface, then the specific powered device has potential for damaging the surface. Accordingly, a user alarm may be generated urging the user to move the powered device, and/or power transfer to the power receiver may be inhibited. E.g. the power transfer may be prevented or only allowed below a given power limit which is guaranteed to not result in temperatures that may damage the surface.

In most embodiments, the first temperature is a measured temperature, i.e. it is a value that is directly provided by a temperature sensor, or it may be a temperature that has been derived from such a measurement. Such temperatures may allow a dynamic adaptation of the control functions and may specifically provide improved flexibility and usability. For example, a powered device may operate without any modifications provided the current temperature does not exceed acceptable levels. For example, a pot may be used at low heat settings even if positioned in the preparation zone but with power being restricted if the temperature of a surface increases to levels that could result in damage to the work surface.

In some embodiments, the first temperature may thus directly be measured by a temperature sensor in contact with the relevant part of the powered device. In many embodiments, the first temperature may reflect a temperature of a surface that will contact with a surface of the power transmitter when the power receiver is positioned on the power transmitter for power transfer. The first temperature may accordingly be provided by a temperature sensor which is in contact with such a surface.

In some embodiments, the first temperature may be calculated or estimated from a temperature provided by a temperature sensor which is not in direct contact with the specific part or surface of the powered device, i.e. an indirect measurement may be made.

For example, a measurement may be made on another part of the powered device and a thermal model may be used to assess the corresponding temperature on the relevant part, such as e.g. on the contact surface. The thermal model may be a complex model taking into account other operating parameters, a plurality of temperature measurements etc. In other embodiments, the model may for example be a simple look-up table which for a given measured temperature value provides the estimated/indirectly measured temperature of the relevant part.

For example, the first temperature may e.g. be measured by measuring the actual temperature of the heating element and then using the thermal resistance of an isolation layer between the heating element and a base of the appliance to determine the expected temperature on the base of the heating element.

The determination of the temperature is typically performed in the power receiver such that the first temperature transmitted to the power transmitter can be used directly as an estimate/measurement of the current temperature of the relevant part of the powered device. This allows the power transmitter to use a standard approach for all powered devices and it does not need to consider specific characteristics of the individual powered device.

In many embodiments, the power transmitter is further arranged to restrict the power of the power transfer signal and/or to generate a user alert in response to not receiving a first temperature from the power receiver (e.g. within a given time interval).

Thus, if the power transmitter 101 detects the presence of a power receiver 105 which is to be powered (or is being powered), it proceeds to monitor for data messages being received which indicate the first temperature. If none are received, the power transmitter may proceed to terminate any ongoing power transfer or prevent a new one starting. Alternatively, it may allow power transfer but restrict this to a level that can be guaranteed to not heat an external device to unacceptable temperatures. This may ensure that unacceptable temperatures are not reached even for devices that do not support the enhanced functionality (or are faulty).

Typically, a user alert may also be generated in such scenarios in order to indicate to the user the reason for the powered device not being powered. Indeed, in some embodiments, the power transfer may proceed as normal but with a user alert being generated to alert the user to the potential risk. In such an embodiment, the user may thus make a decision on the appropriate action to take (if any).

It will be appreciated that the approach may be used for a plurality of power transmitters. Indeed, in the specific example (e.g. of FIG. 5), an apparatus is provided with a plurality of power transmitters. The functionality of FIG. 2 or 6 may be provided for each of these power transmitters. Furthermore, the reference temperature which is used for the comparison may be different for different power transmitters. Specifically, the reference temperature for the power transmitters that are located in the preparation zone may be substantially lower than the reference temperature for power transmitters that are located in the cooking zone.

In some embodiments, the system of FIG. 2 may include a selector for selecting the reference temperature from a plurality of reference temperatures in response to a position indication for the power receiver where each reference temperature is associated with a set of positions. The reference temperatures for the different sets will typically be different (and typically substantially different).

For example, the temperature receiver 207 may be arranged to receive first temperatures from a plurality of different power receivers, typically with each power receiver being powered by a different power transmitter or power transmitter coil. The comparator 209 may compare each received temperature to a reference temperature but with the specific reference temperature used depending on where the power receiver is positioned. Specifically, the reference temperature may be dependent on which power transmitter receives the first temperature (over a short communication link). If the comparator 209 detects that the received first temperature exceeds the selected reference temperature, it instructs the first controller 213 of this and accordingly the first controller 213 proceeds to restrict the power level of the power transfer signal generated by the power transmitter associated with the short range communication unit that received the first temperature.

(It will be appreciated that the temperature receiver 207 in this case may be considered to be distributed and include all the short range communication units of the different power transmitters, or the temperature receiver 207 may be considered to be a central unit which receives the first temperatures from the different short range communication units).

The position indication which is used to select the reference temperature to use may typically be an indication of which power transmitter/power transmitter coil the power receiver is coupling to, and this may typically be indicated by which of short range communication unit is receiving the first temperature. Thus, in many embodiments, the reference temperature is selected in dependence on which short range communication unit receives the first temperature.

The system may thus provide different functionality for power transmitters/power transmitter coils in different zones. The reference temperature for the preparation zone may for example be selected to be much lower than the reference temperature for the cooking zone.

In some embodiments, a detection of the first temperature exceeding the reference temperature will result in a user alert being generated by the power transmitter side, e.g. by the kitchen unit. However, in some embodiments, the unit may comprise a transmitter which is arranged to transmit an indication of the detection of the first temperature exceeding the reference temperature to the power receiver. The power receiver may then (alternatively or additionally) generate a user alert. For example, the powered device may comprise a warning light which lights up if it is positioned on a power transmitter located under a surface that could be damaged by the current temperature of a contact surface of the powered device. The indication by the powered device may in many embodiments be more immediate than if provided (only) at the transmitting side.

It will be appreciated that any suitable means of communication can be used to communicate data from the power transmitter to the power receiver. For example, data may be modulated on to the power transfer signal, or in many embodiments the NFC short range communication may be a bidirectional communication In some embodiments, the comparator 209 may be comprised in the power receiver 105.

In such embodiments, the reference source 211 may comprise a receiver which is arranged to receive the reference temperature from the power transmitter 101. For example, the power transmitter 101 may be arranged to transmit the reference temperature to the power receiver 105 when it detects the presence of the power receiver 105. The communication may specifically be via the NFC short range communication link. The reference source 211 may thus receive the reference temperature over the NFC communication link when the powered device is positioned such that it couples to the power transmitter 101.

The reference temperature is fed to the comparator 209 which also receives the first temperature from the temperature receiver 207. The temperature receiver 207 may in this case receive the first temperature from an internal source, such as from a temperature sensor in contact with the relevant part of the powered device (or from a temperature sensor providing a measurement from which the first temperature can be estimated/calculated).

If the comparator 209 detects that the first temperature exceeds the reference temperature, the power receiver 105 may in some embodiments transmit an indication of this detection to the power transmitter 101. In response, the power transmitter 101 may proceed to restrict power of the power transfer signal and/or to generate a user alert.

Thus, in such scenarios, the first controller 213 may be considered to be implemented in the power receiver 105 and to restrict power/generate user alerts by transmitting appropriate messages to the power transmitter 101. Similarly, it could be considered that the first controller 213 is implemented in the power transmitter 101 and receives messages from the comparator 209 comprised in the power receiver 105 resulting in the first controller 213 controlling the power of the power transfer signal.

Thus, in an exemplary embodiment wherein most of the enhanced control functionality is comprised in the power receiver 105, the power transmitter 101 may communicate the allowed maximum temperature of the work-surface to the power receiver 105. The power receiver 105 can then decide, based on the allowed temperature of the work-surface and the maximum temperature and/or actual temperature of the base of the appliance, if
    power reception is allowed and
    to which power level.

It may then proceed to control the power transfer operation accordingly.

The powered device may optionally inform the user of the status of the system, and may specifically indicate:
    if it is being powered,
    if the power level is reduced,
    if the powered device is too hot for the work-surface (alarm), and/or
    the actual temperature of the base of the appliance An advantage of the approach of having this functionality in the power receiver is that the power receiver does not have to wait for a decision of the power transmitter. It may often allow a faster indication to the user of a risk of potential damage to the work-surface.

For example, the power receiver may monitor the first temperature constantly and control the power transfer such that it never exceeds the first reference temperature.

As another example, the power receiver could use a further, typically predetermined, reference temperature that is considered to be safe for any surface and/or for being touched by a human. The controller (213) may allow this predetermined reference temperature to only be exceeded if it has received a first reference temperature from the power transmitter (to which it is associated for power transfer). However, if the power receiver is not associated with any power transmitter (or is associated with one that has not provided a reference temperature), it will use the predetermined reference temperature. For example if the device comprising the power receiver has been powered by a power transmitter in the cooking zone and the user lifts the device in order to place it somewhere else, the power receiver may warn the user that the first temperature exceeds the predetermined reference temperature. This can prevent that the user touches an excessively hot part of the device and/or can prevent the user from placing the powered device in an area where the receiving surface is not capable of withstanding a high temperature.

Thus, in some embodiments, the power receiver may be arranged to determine the reference temperature as a predetermined reference temperature if a reference temperature has not been received from an associated power transmitter (i.e. from the power transmitter providing power). The predetermined reference temperature may be stored in the power receiver and may not be associated with any power transmitters. Rather, the predetermined reference temperature may be a default or nominal reference temperature used in the absence of a specific reference temperature being provided by a power transmitter. If a specific reference temperature is received from a power transmitter providing power to the power receiver (or just communicating using a short range communication system), this reference temperature may overwrite the predetermined reference temperature for as long as the power receiver is coupled to this power transmitter.

Figure 7:
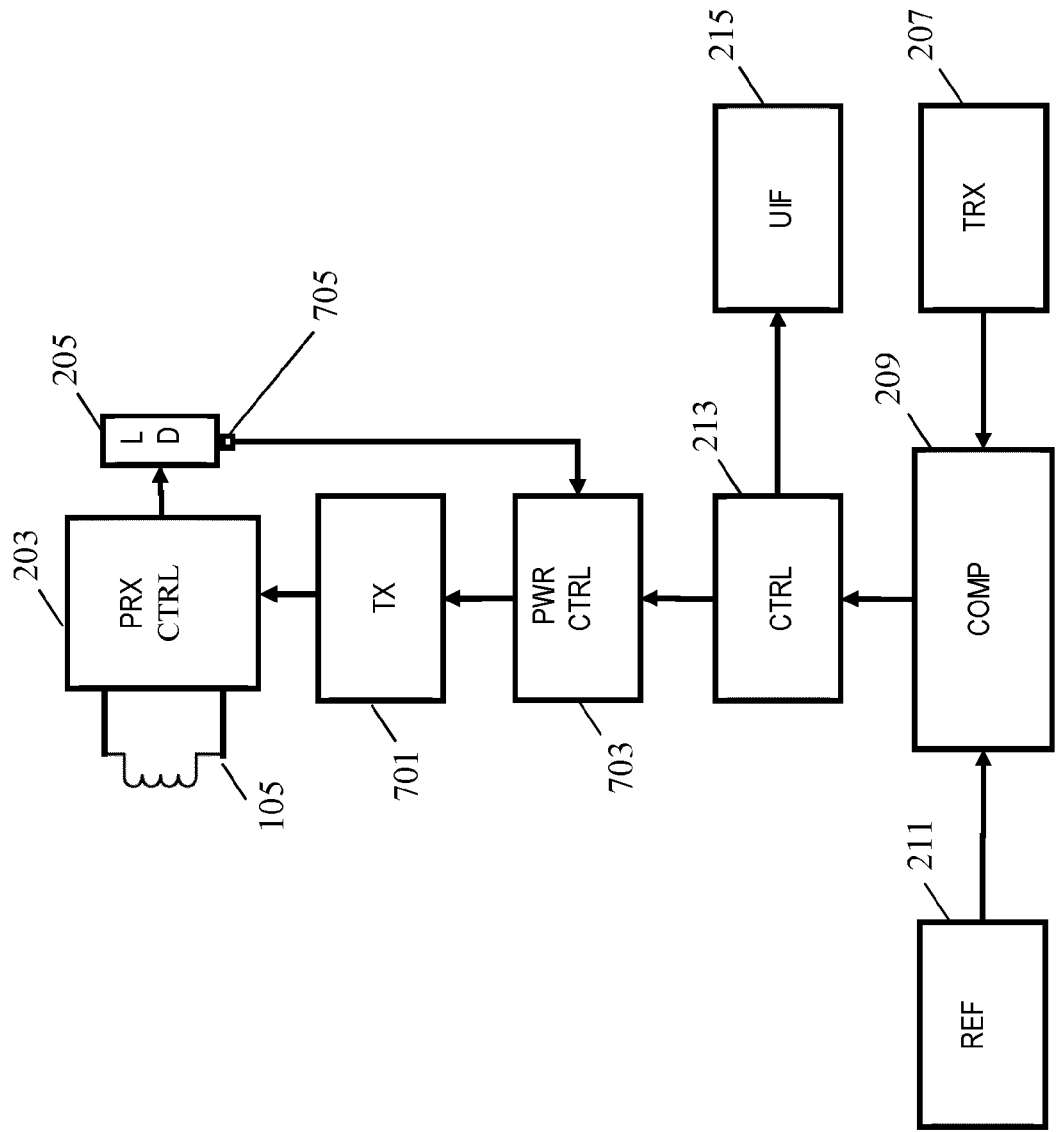
FIG. 7 illustrates an example of a power receiver in accordance with some embodiments of the invention.

FIG. 7 illustrates an example of power receiver wherein the control functionality of FIG. 2 is implemented in the power receiver.

In some embodiments, the first controller 213 may be implemented in the power receiver 105 and may restrict the power of the power transfer signal by requesting the power transmitter 101 to reduce the power of the power transfer signal. For example, in response to a detection that the first temperature exceeds the reference temperature, the first controller 213 may initiate that power down requests are transmitted to the power transmitter 101 until the first temperature has dropped to a reasonable level. The first controller 213 may specifically modify the power control loop operation to cause the reported error control messages to request power down. This may for example allow the system to be used with a standard non-enhanced power transmitter.

Thus the power receiver 105 supports a power control loop where power control loop feedback messages are transmitted from the power receiver 105 to the power transmitter 101. The power control loop feedback messages may request that the power of the power transfer signal is increased, decreased or remain the same. The power transmitter 101 may then adjust the power of the power transfer signal accordingly.

Specifically, as illustrated in FIG. 7, the power receiver 105 may comprise a power control transmitter 701 which is arranged to transmit power control loop feedback messages to the power transmitter 101. The power control loop feedback messages may specifically be transmitted by load modulation and may specifically be transmitted at least every 250 msec corresponding to the Qi spec. The power control loop feedback messages may request a power up or a power down for the power transfer signal. When the power transmitter 101 receives a power control loop feedback message, it may proceed according to the request, i.e. it may increase or decrease the power level by predetermined amount.

The power receiver 105 furthermore comprises a power controller 703 which is coupled to the power control transmitter 701. The power controller 703 is arranged to generate the power change requests for the power control loop feedback messages, i.e. it may determine whether power up or power down (or no change) requests should be included in the power control loop feedback messages.

In the power receiver 105 of FIG. 7, the power control loop is temperature based and the power change requests are determined based on a temperature, and specifically based on the heating part temperature. Accordingly, the power receiver 105 comprises a heating part temperature sensor 705 which measures the heating part temperature. The heating part temperature sensor 705 may for example be directly in contact with the heating part temperature, or may e.g. be measured via other elements. In the latter case, a thermal model may e.g. be used to estimate the heating part temperature from the measured temperature, or any estimated difference may for example be included in the processing of the heating part temperature, such as specifically may be included in an operating reference temperature being modified accordingly.

The heating part temperature sensor 705 is coupled to the power controller 703. During heating, the power controller 703 may compare the measured heating part temperature to a desired operating temperature of the heating part. If the measured heating part temperature exceeds the desired operating temperature, a power request requesting that power is decreased is generated and otherwise a power request requesting that power is increased is generated. As a result, the power of the power transfer signal will be biased towards a level that results in the heating part temperature having the desired operating temperature.

The power receiver 105 of FIG. 7, and thus the systems of FIGS. 1 and 2, may accordingly support a temperature controlled power control loop which can control the power of the power transfer signal to result in a desired operating temperature of the heating part temperature.

In some embodiments, this power control loop may additionally be dependent on the first temperature, i.e. on the temperature of the contact surface of the powered device. Specifically power down requests may be transmitted if the first temperature exceeds the reference temperature. Thus, the power change requests of the power control loop feedback messages may also depend on the first temperature.

The power control loop feedback messages may during normal operation depend on the desired operating conditions. Specifically, when the first temperature is below the reference temperature, the power control loop may depend on the desired operating temperature of the heating part temperature. However, if the first temperature exceeds the reference temperature, the operation may be modified such that power down requests are transmitted regardless of the difference between the current and desired operating temperatures. Thus, the comparison of the first temperature to the reference temperature may be a safety precaution that can override the normal operation of the power control loop.

The power receiver accordingly may comprise two or more temperature sensors. A first sensor may be used to determine the first temperature. For example, the temperature sensor may be positioned in contact with a contact surface of the powered device.

The power receiver further comprises a second temperature sensor which is used to determine a second temperature being a temperature of a heating part of the powered device, such as e.g. the heating element of a kettle or pot.

Thus, the system may (directly or indirectly) measure the temperature of the heating element of a powered device as well as a temperature of a contact surface of the powered device.

The power control loop may in such an embodiment be based on the second temperature, i.e. the power control loop can be controlled to provide the desired temperature of the heating element. However, rather than just operate the power transfer to provide the desired temperature of the heating element, the system further includes a safety operation which detects if the temperature of a contact surface of the powered device exceeds a given reference temperature (typically corresponding to a maximum allowable temperature of a surface of the device or unit comprising the power transmitter).

If overheating is detected, the system may terminate power transfer, reduce power and/or generate a user alert in accordance with any of the previously described approaches.

In some embodiments, the power control loop controller may specifically generate power requests dependent on both the first and second temperature. Specifically, the power requests may be generated in dependence on the second temperature as long as the first temperature is below the reference temperature. However, if the first temperature exceeds the reference temperature, power down requests may be generated regardless of the second temperature.

A specific example of the operation of a power transfer system in accordance with the described approach will be provided with specific reference to FIG. 8.

In the example, a powered device 801 in the form of kettle may be heated by a power transmitter.

The powered device 801 comprises a heating element in the form of an iron plate 803, one temperature sensor 805 measuring the temperature of the heating element, one temperature sensor 807 measuring the temperature of a contact surface (base) of the powered device 801. The iron plate 803 will heat up if exposed to an alternating magnetic field.

The powered device 801 further comprises a secondary communication coil 809, a short range communication unit 811, and a user interface 813.

In the example, there is a distance (e.g. 1 cm) between the iron plate 803 and the base/contact surface of the powered device 801 in order to thermally insulate the base from the plate. The first temperature sensor 801 is attached to the iron plate 803 such that it provides a value representing the temperature of the plate 803. The second temperature sensor 807 is attached to the base of the powered device 801 such that it provides a value representing the temperature of the base of the powered device 801 which is in touch with a work-surface 815 of a kitchen unit which can wirelessly power the iron plate 803.

The unit comprises at least one power transmitter 101, and specifically comprises a transmit power coil 817 for powering the powered device 801 and a primary communication coil 819 for communicating with the power receiver. The power transmitter 101 further comprises a short range NFC communication unit 821 for communicating with the communication unit 811 of the receiver.

The exemplary system may specifically operate as follows:

1) The power transmitter 101 may detect the powered device 801 by sending a ping signal through the primary communication coil 819. The communication unit 811 of the powered device 801 receives the ping signal through the secondary communication coil 809. The communication unit 811 unit responds with e.g. an identification message through the communication coils 809, 819 to the transmitter communication unit 821 to indicate the presence of the powered device 801.
   Optionally the power transmitter may indicate to the user that it has detected an appliance, e.g. by producing a sound. Optionally the power device 801 may indicate to the user that it has been pinged by a power transmitter, e.g. by turning on an LED at the user interface 813.
   The primary communication unit 821 may transmit a maximum allowed temperature of the work-surface to the power receiver (i.e. a reference temperature).

2) The user starts the powered device 801 e.g. by setting a desired temperature and pushing a button on the user interface 813. The power receiver then requests a power transfer and communicates an initial power demand to the power transmitter 101. The power transmitter 101 starts a power driver to provide a magnetic field through the primary power coil 817. The iron plate 803 of the powered device 801 is exposed to the magnetic field and starts to heat up.

3) The power receiver regulates the temperature of the iron plate 803 based on the difference between the desired temperature and the actual temperature as measured by the first temperature sensor 801. The control of the temperature is achieved by regularly sending an update of the required power demand to the power transmitter 101. The power transmitter 101 modifies the magnetic field by controlling the power driver according to the actual power demand. Additionally, the power receiver limits its power demand when the temperature of the base indicated by the second temperature sensor 807 reaches the reference temperature. Additionally the power receiver may inform the user of the operation via the user interface 813, e.g. by displaying the actual temperature of the iron plate 803, indicating the limiting functionality caused by the allowed temperature limit of the work-surface, etc.
   If the temperature of the base of the powered device 801 exceeds the allowed limit of the work-surface 815, e.g. because the appliance is moved from a work-surface that can withstand a high temperature to one that cannot withstand this high temperature (or simply due to the powered device heating up to a level which cannot be supported by the work surface), the power receiver will detect this and warn the user that the actual temperature of the base exceeds the temperature limit of the work-surface. It may for example indicate an alarm by flashing a light indicating that the user has to remove the appliance from the work-surface.

4) The power receiver communicates the temperature of the base of the powered device 801 to the power transmitter 101. If the temperature of the base of the appliance reaches the maximum allowed temperature (e.g. 50 degrees Celsius), the power transmitter 101 reduces the power of the power transfer signal, and may specifically abandon the power transfer.
   Typically, the power transmitter 101 may also warn the user when the temperature of the base of the powered device 801 has reached the allowed limit of the work-surface 815, e.g. by producing a warning sound. If the temperature of the base of the powered device 801 exceeds the allowed limit of the work-surface 815, e.g. because the powered device 801 is moved from a work-surface that can withstand a high temperature to one that cannot withstand such a high temperature, the power transmitter 101 can warn the user that the actual temperature of the base exceeds the temperature limit of the work-surface, e.g. by producing an alarm sound thereby indicating that the user should remove the appliance from the work-surface. In some scenarios, the power transmitter 101 can inform the power receiver of the detection of an excessive temperature and the power receiver can then warn the user via the user interface 813.

It will be appreciated that in some embodiments, redundancy may be introduced by e.g. independent control functionality being implemented in both the power transmitter 101 and the power receiver 105. For example, the power transmitter of FIG. 6 can be used with power receivers of FIG. 7.

An advantage of this approach is that if one of the comparator instances (109), or one of the controller instances (213), fails, the other instance could still be operable and prevent or reduce the risk of undesirable scenarios. Another advantage of this approach is that the power receiver may provide a fast reaction or close control to prevent an undesirable situation before the power transmitter reacts. For example, the power receiver may be in control to prevent that the first temperature does not exceed the reference temperature. If the power receiver fails in this, the power transmitter can take over control as a back-up safety measure and e.g. terminate power transfer.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A wireless power transfer system including a power transmitter and a power receiver, the power transmitter being arranged to generate a wireless inductive power transfer signal for powering the power receiver, the wireless power transfer system comprising:
    a receiver for receiving a first temperature for a first part of a powered device, the powered device comprising a heating part arranged to be heated by power from the power transfer signal and the first part being a contact surface of the powered device for contacting the power transmitter;
    a comparator for comparing the first temperature to a first reference temperature, the first reference temperature being indicative of a maximum allowable contact temperature for a surface of the power transmitter for receiving the power receiver; and
    a controller for at least one of restricting the power of the power transfer signal and generating a user alert in response to the first temperature exceeding the first reference temperature; and wherein
    the power receiver comprises
    a first temperature sensor for determining a second temperature for a heating part of the powered device,
    a transmitter for transmitting power control loop feedback messages for requesting power level changes of the power transfer signal to the power transmitter during power transfer, and
    a power controller for generating power change requests for the power control loop feedback messages in response to the second temperature.

2. The wireless power transfer system of claim 1 wherein the power receiver comprises a second a temperature sensor arranged to measure the first temperature.

3. The wireless power transfer system of claim 1 wherein the first temperature is a predetermined maximum temperature of the contact surface.

4. The wireless power transfer system of claim 1 wherein the controller is arranged to restrict the power of the power transfer signal in response to the first temperature exceeding the first reference temperature.

5. The wireless power transfer system of claim 1 wherein the controller is arranged to generate the user alert in response to the first temperature exceeding the first reference temperature.

6. The wireless power transfer system of claim 1 wherein the first part is a different part of the powered device than the heating part.

7. The wireless power transfer system of claim 1 wherein the receiver, comparator and controller are comprised in the power transmitter.

8. The wireless power transfer system of claim 7 wherein the receiver is arranged to receive the first temperature from the power receiver.

9. The wireless power transfer system of claim 8 wherein the controller is arranged to restrict the power of the power transfer signal or to generate a user alert in response to the receiver not receiving the first temperature from the power receiver.

10. The wireless power transfer system of claim 7 wherein the power transmitter is arranged to transmit an indication of a detection of the first temperature exceeding the first reference temperature to the power receiver.

11. The wireless power transfer system of claim 1 further comprising a second power transmitter; and:
- a second receiver for receiving a second temperature for a part of a second powered device, the second powered device being powered by a second power receiver powered by the second power transmitter;
- a second comparator for comparing the second temperature to a second reference temperature associated with the second power transmitter; and
- a second controller for at least one of restricting a power of a power transfer signal of the second power transmitter and generating a user alert in response to the second temperature exceeding the second reference temperature; wherein the second reference temperature is different from the first reference temperature.

12. A power receiver for a wireless power transfer system including a power transmitter arranged to generate a wireless inductive power transfer signal for powering the power receiver, the power receiver comprising:
- a receiver for receiving a first temperature for a first part of a powered device, the powered device comprising a heating part arranged to be heated by power from the power transfer signal and the first part being a contact surface of the powered device for contacting the power transmitter;
- a comparator for comparing the first temperature to a first reference temperature, the first reference temperature being indicative of a maximum allowable contact temperature for a surface of the power transmitter for receiving the power receiver;
- a controller for at least one of restricting the power of the power transfer signal and generating a user alert in response to the first temperature exceeding the first reference temperature;
- a first temperature sensor for determining a second temperature for a heating part of the powered device;
- a transmitter for transmitting power control loop feedback messages for requesting power level changes of the power transfer signal to the power transmitter during power transfer; and
- a power controller for generating power change requests for the power control loop feedback messages in response to the second temperature.

13. The power receiver of claim 12 wherein the controller is arranged to generate power down requests for the power control loop feedback messages in response to the first temperature exceeding the first reference temperature.

14. The power receiver of claim 12 further comprising a reference temperature receiver for receiving the first reference temperature from the power transmitter.

15. The power receiver of claim 14 wherein the comparator is arranged to set the first reference temperature to a predetermined value in the absence of the first reference temperature being received from the power transmitter.

16. The power receiver of claim 1 wherein the heating part is an inductive heating element arranged to be heated by induction from the power transfer signal.

17. A method of operation for a wireless power transfer system including a power transmitter and a power receiver, the power transmitter being arranged to generate a wireless inductive power transfer signal for powering the power receiver, the method comprising:
- receiving a first temperature for a first part of a powered device, the powered device comprising a heating part being heated by power from the power transfer signal;
- comparing the measured temperature to a first reference temperature, the first reference temperature being indicative of a maximum allowable contact temperature for a surface of the power transmitter for receiving the power receiver; and
- at least one of restricting the power of the power transfer signal and generating a user alert in response to the first temperature exceeding the first reference temperature;
- a temperature sensor of the power receiver determining a second temperature for a heating part of the powered device,
- the power receiver transmitting power control loop feedback messages for requesting power level changes of the power transfer signal to the power transmitter during power transfer, and
- the power receiver generating power change requests for the power control loop feedback messages in response to the second temperature.

* * * * *